G. R. BACON.
Breech-Loading Fire-Arm.
No. 1,634. Reissued Mar. 15, 1864.
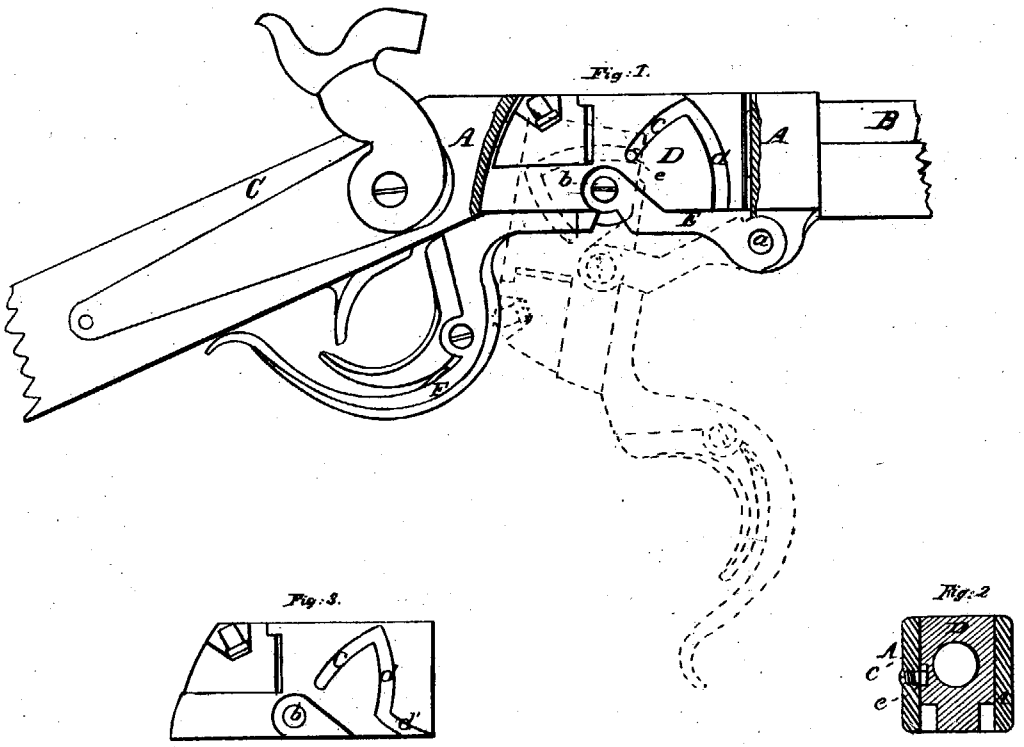
Witnesses:
M. Crosby
G. W. Reed
Inventor:
G. R. Bacon
per Munn & Co
Attorneys
N. PETERS, PHOTO-LITHOGRAPHER, WASHINGTON, D. C.

UNITED STATES PATENT OFFICE.

THE BURNSIDE RIFLE COMPANY, OF NORTH PROVIDENCE, RHODE ISLAND, ASSIGNEES OF GEORGE R. BACON.

IMPROVEMENT IN BREECH-LOADING FIRE-ARMS.

Specification forming part of Letters Patent No. 39,270, dated July 21, 1863; Reissue No. 1,634, dated March 15, 1864.

*To all whom it may concern:*

Be it known that GEORGE R. BACON, of the city and county of Providence, in the State of Rhode Island, has invented a new and useful Improvement in Breech-Loading Fire-Arms; and it is hereby declared that the following specification, taken in connection with the drawings making a part of the same, is a full, clear, and exact description thereof.

Figure 1 is right-hand view of the frame and parts of the stock and barrel of a fire-arm, representing the frame partly broken away to expose the cartridge-block. Fig. 2 is a transverse vertical section of the same. Fig. 3 is a side view of the breech-block, illustrating a modification of the invention.

The invention which is the subject of this patent has reference to that class of fire-arms which are provided with a movable breech-block for holding the cartridge, and though particularly adapted to that variety of arm known as the "Burnside rifle," when constructed with the improvement described in the Letters Patent granted to Isaac Hartshorn, dated March 3, 1863, it is also applicable to all other breech-loading fire-arms which are made with a movable breech-piece.

The object of the invention is to guide and control the breech-block in its several movements from the position for loading to the position for firing, and vice versa; and it consists in a means whereby the path of travel in different directions, which may be given to it for the greater convenience of loading may be with certainty directed, during the act of moving it to and from its respective positions for loading or firing without the necessity of the exercise of any intelligence for that purpose on the part of the person using the weapon.

In the accompanying drawings, the cartridge-block is shown as connected with the frame which incloses it by an intermediate link, the object of which link is to accommodate the breech-block to a position more nearly at right angles with the frame when in position for loading, as particularly described in the patent granted to the said Isaac Hartshorn before referred to. In working the block with this link-connection, as shown in Fig. 1, two movements are necessary—the one a movement of the block and link together on the pin which connects the link with the frame, and the other a movement of the block alone upon the pin which connects it with the link, while in Fig. 3, hereinafter to be explained, an additional movement is required in which the action of both the joints above mentioned is involved. In operating the cartridge-block, the proper order of these movements must be observed, otherwise the rear end of the block will strike against the frame, for the reason that it must necessarily enter and leave the frame upon the arc of a circle with a fixed radius. This fact constitutes an objection of much weight to the convenience in handling the weapon, and especially to placing it in the hands of men who, in the excitement of battle, cannot be expected to attend with coolness and precision to such details of manipulation. The invention of the said GEORGE R. BACON remedies this objection by the use of a compound curved groove cut in one side of the block, which shall express the various changes of direction which it is proposed that the block shall make in its proper movements to the respective positions for loading and firing, into which groove the point of a stationary pin projects inwardly from the contiguous side of the frame to guide the block through the movements indicated by the figure which the groove makes.

A is the frame of the arm; B, the barrel; and C, the stock.

D is the cartridge-block, and E the link which connects it with the frame. *a* is the pin which attaches the link E to the frame, and *b* is the pin which attaches the cartridge-block to the link.

F is a lever, rigidly attached to the cartridge-block for the purpose of manipulating it.

In Figs. 1 and 2, *c d* is the compound curved groove in the cartridge-block; and *e* the stationary pin screwed into one side of the frame to enter the said groove. The groove *c* should always describe the arc of a circle whose center is the pin *a;* but the groove *d* need not be necessarily compose the arc of a circle whose center is the pin *b*, as it is represented to be in Fig. 1; but the center of the circle of which it is an arc may be otherwise located, as shown in Fig. 3, in which case, while the cartridge-block is moving upon the curve of such groove there will be not only a movement of the block upon the pin *b*, but also a movement of the block and link together upon the pin *a*.

To bring the cartridge-block from the position for firing (shown in black outline in Fig. 1) to the position for loading, (shown in red outline in the same figure,) the lever F is pulled downward and forward. During the first part of this movement, and while the pin *e* remains in the groove *c*, both the cartridge-block and the link E move together on the pin *a* as if they were united; but as soon as the pin *e* enters the groove *d*, the further downward movement of the link E ceases, but the cartridge-block commences to turn on the pin *b* in such manner as to present the mouth of its chamber for the reception of the cartridge. In returning the lever to the position close under the stock, the reverse of the preceding movement takes place—that is to say, the cartridge-block turns upon the pin *b* until it coincides with the link, when the pin *e* having entered the groove *c*, both link and block are turned on the pin *a* and the cartridge-chamber brought nto line with the barrel.

In Fig. 3 the groove *d* is upon a curve differently described than in Fig. 1, and there is also an additional groove, *d'*. This modification causes in the first place, the cartridge-block to be moved higher up in the frame, so that the mouth of the chamber is nearer on a line with the top of the frame, and is more accessible for the insertion of the cartridge, and in the second place, after the pin *e* has entered the groove *d'*, the block is thereby prevented from swinging, which latter provision is of great assistance to the mounted rifleman in rapid loading.

It is obvious that when the groove *d* is otherwise than upon a curve described from the pin *b* as a center, the cartridge-block will, after the stud-pin *e* has entered such groove, have a motion which both the joints *b* and *a* must accommodate themselves to.

What is claimed as the invention of the said GEORGE R. BACON, and is desired to be secured by Letters Patent, is—

The method, substantially as described, of guiding the movements of the movable cartridge-block in a breech-loading firm-arm by the combination of a stationary pin, *e*, with a compound groove, as herein specified.

BURNSIDE RIFLE CO.,
By ISAAC HARTSHORN,
*Agent.*

In presence of—
BENJ. F. THURSTON,
BYRON SPRAGUE.